Feb. 14, 1939.      B. C. KINGSBURY      2,147,534
PITMAN LOCK RING
Filed Aug. 5, 1937
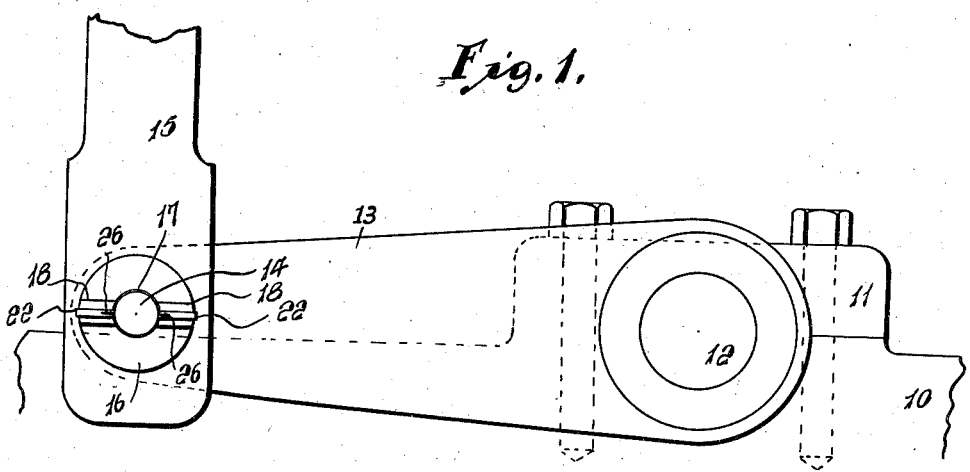
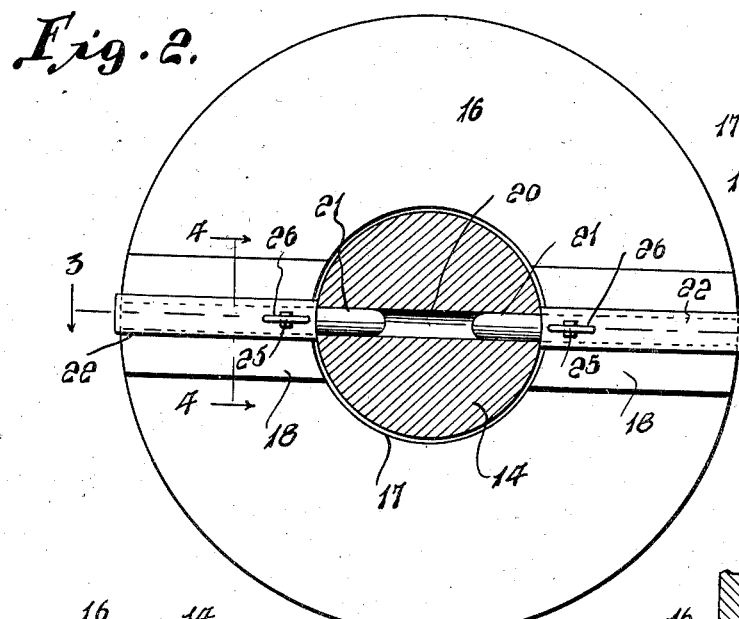
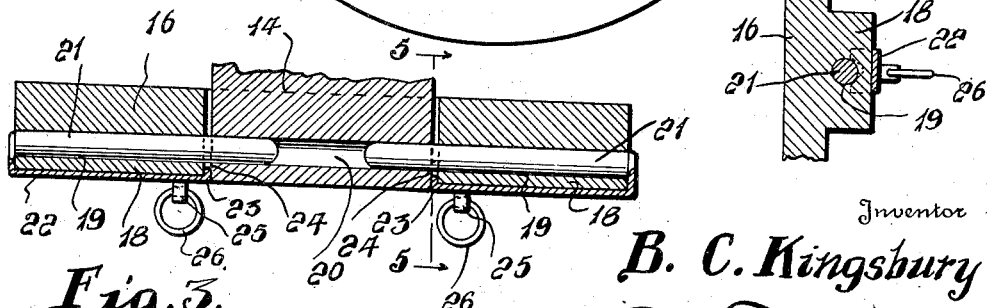
Inventor
B. C. Kingsbury
By [signature]
Attorney Patented Feb. 14, 1939

2,147,534

UNITED STATES PATENT OFFICE 2,147,534

PITMAN LOCK RING

Bert C. Kingsbury, Lebec, Calif.

Application August 5, 1937, Serial No. 157,609

5 Claims. (Cl. 85—7)

This invention relates to a locking ring for securing pitmans to cranks.

Many persons are injured while working around oil well drills, by having their clothing caught in the pin or bolt which holds a pitman on a stub shaft connected to a crank.

It is the object of this invention to provide a device to engage the end of such stub shaft to hold a pitman in position thereon which will be constructed in such a way that the operator of the machine will not be injured.

A further object of the invention is to provide such a device with a latching member to engage a collar or ring to prevent the collar from becoming accidentally released from the sub-shaft of a crank.

Other objects and advantages of the invention will hereinafter become more fully apparent from the following specification of which the drawing forms a part, and wherein:

Figure 1 is a side elevational view of the invention applied to a pin or stub shaft to connect a crank and a pitman, Figure 2 is an enlarged elevational view of the invention applied to a stub shaft or pin shown in section, Figure 3 is a cross sectional view on the line 3—3 of Figure 2, Figure 4 is a cross sectional view on the line 4—4 of Figure 2, and Figure 5 is a cross sectional view on the line 5—5 of Figure 3.

Referring more particularly to the drawing wherein like reference characters designate like or corresponding parts in the different views, 10 designates a frame and 11 a bearing in which is mounted a driven shaft 12 to which is connected a crank 13 provided at its free end with a pin or stub shaft 14 on which is mounted a pitman 15 shown to illustrate the preferred application of the invention.

The invention comprises a ring or collar 16 provided with an opening 17 to engage stub axle 14 and provided with enlarged portions 18 formed on each side of opening 17 on one side of collar 16. The enlarged portions 18 extend radially from opening 17 to the periphery of collar 16.

Portions 18 are provided with longitudinal bores 19 adapted to be aligned with opening 20 which extends transversely through stub axle 14.

Pins 21 extend through bores 19 into opening 20 to secure collar 16 to stub axle 14. Formed integral with the outer end of pins 21 are tongues or latch members 22 which are bent to extend along the outer face of members 18 and which have their free ends bent inwardly to form the portions 23 which engage between stub shaft 14 and members 18, ends 23 being notched at 24 to accommodate pins 21 as best seen in Figure 5.

Secured to the members 22 are studs 25 in which are loosely mounted rings 26. Tongues 22 are formed of a resilient material so that rings 26 must be pulled outwardly to release ends 23 from between shaft 14 and members 18 in order to remove pins 21.

Although this invention has been described in connection with a crank and pitman, it is obviously well adapted for other uses where bolts and cotter pins and the like are employed, such as connecting a wheel to an axle.

The manner of removing pins 21 has been explained, and it will therefore be seen that to apply the invention collar 16 is applied to shaft 14 and openings 19 are aligned with opening 20. Pins 21 are then inserted with ring 26 being pulled outwardly to separate end 23 from pin 21 until pin 21 is fully inserted. Ring 26 is then released alowing end 23 to engage between shaft 14 and member 18 to lock pin 21 in opening 20.

It is to be understood that only the preferred embodiment of the invention has been shown and described the right being reserved to make such changes as do not depart from the spirit and scope of the invention as claimed.

I claim as my invention:—

1. In a device of the class described, a ring adapted to engage a shaft and provided with opposed openings to be aligned with an opening through said shaft, latch members to engage said openings each comprising a pin having a tongue extending from one end thereof and bent to extend parallel to said pin a portion of its length to engage said ring, and the free end thereof being bent inwardly to engage between the ring and shaft to form a latch.

2. A device of the class described comprising a collar to engage the end of a shaft and provided with radially extending openings to be aligned with said shaft opening; and pins to be inserted in said collar openings to engage said shaft opening to secure the collar in position, latch members formed on the end of each pin to extend around said collar and to hook between the shaft and collar.

3. A locking pin and ring comprising a ring to engage a stub shaft or the like and provided with radial openings to be aligned with an opening in said stub shaft, locking pins to extend through said ring openings and into said shaft opening, said pins being provided with tongues extending around said ring, the free end of each tongue being bent inwardly to engage between said ring and shaft to hold the pin in position, and a handle member secured to said tongue to release said locking pin.

4. In combination with a locking ring or collar having opposed radially extending openings and adapted to engage the end of a stub shaft with its openings in alignment with openings in the shaft; locking pins adapted to extend through said aligned openings to retain said ring in position on the shaft, and latch means secured to the outer ends of said pins and being offset therefrom to extend along one side of said ring, the free ends of said latch members being turned inwardly to engage between the ring and shaft to retain the pins in position.

5. A locking ring comprising a ring provided with radially extending bores, pins mounted in said bores and extending into the ring's opening, and a latching member secured to the outer end of each pin and shaped to extend around one side of the ring and having its free end turned inwardly to engage the inner edge of the ring to retain the pin in position, said ring adapted to engage a shaft provided with an opening into which said pins are adapted to extend to retain the ring in position.

BERT C. KINGSBURY.